T. SMOLINSKY.
KITCHEN UTENSIL.
APPLICATION FILED JAN. 15, 1919.
1,306,783.
Patented June 17, 1919.
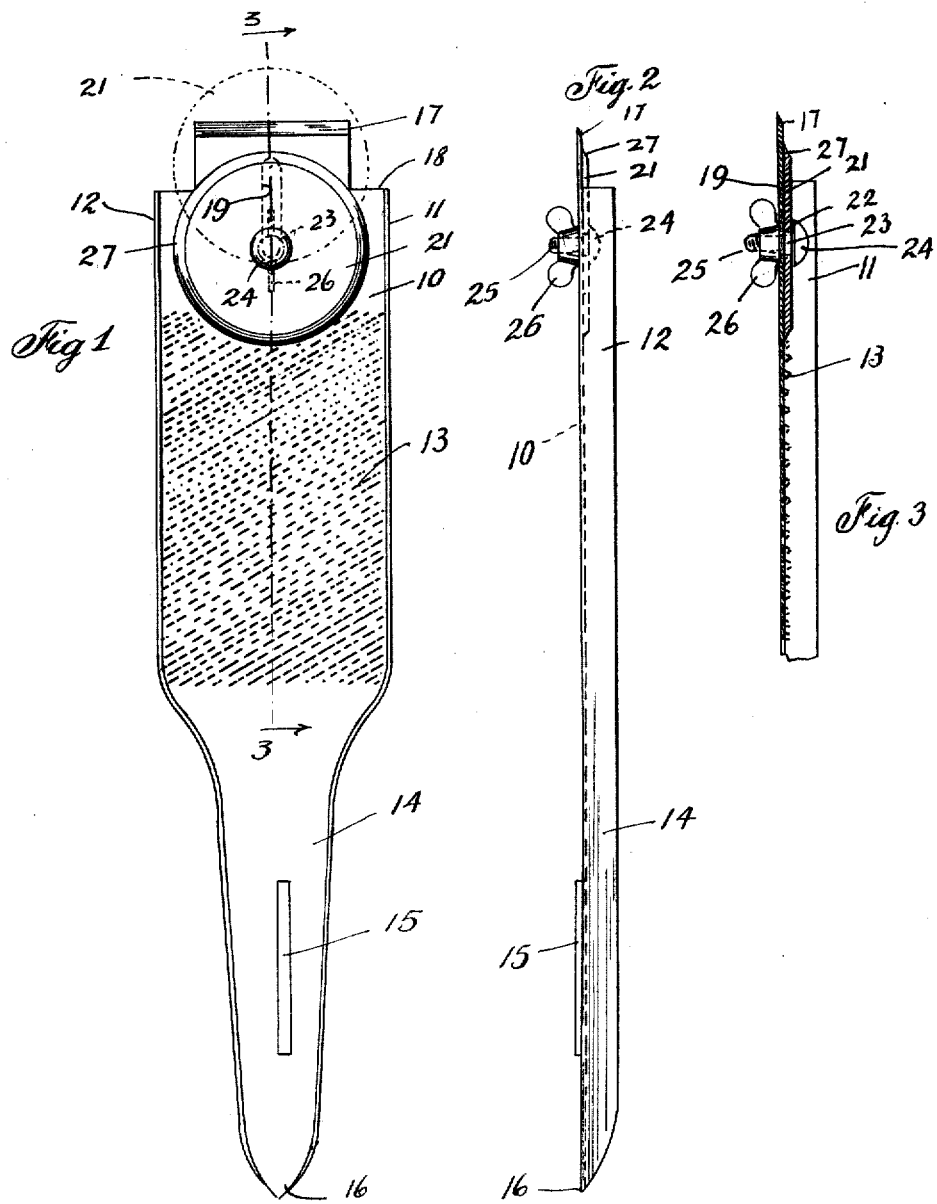
INVENTOR
Theodore Smolinsky
by Rob K Klotz
Atty.

UNITED STATES PATENT OFFICE.

THEODORE SMOLINSKY, OF GARY, INDIANA.

KITCHEN UTENSIL.

1,306,783.   Specification of Letters Patent.   Patented June 17, 1919.

Application filed January 15, 1919.   Serial No. 271,189.

*To all whom it may concern:*

Be it known that I, THEODORE SMOLINSKY, a citizen of the Republic of Austria, residing at Gary, in the county of Lake and State of Indiana, have invented certain new and useful Improvements in Kitchen Utensils, of which the following is a specification.

My invention relates to kitchen utensils. It has for its primary object the provision of an improved article of this type which shall have improved means for cutting and shredding noodles, vegetables and the like. A further object is the provision of an improved cutting implement embodying a straight chisel blade fixed with relation to its handle and a circular blade rotatable about a pivot mounted in the handle of the chisel blade and adjustable therein. A further object is the provision of an improved arrangement of handle and adjustable circular blade such that in the inoperative position of the circular blade the handle forms a guard for protecting the hand of the operator from injury by contact with the edge of the circular blade.

Other objects and advantages of my invention will appear from the following description, taken in conjunction with the accompanying drawings which form a part of this application and illustrate the preferred embodiment of the invention.

In the drawings:

Figure 1 is a top plan view of the invention.

Fig. 2 is an edge elevation thereof as viewed from the left in Fig. 1.

Fig. 3 is a fragmentary section taken approximately on line 3—3 of Fig. 1.

Reference numeral 10 indicates generally a plate of sheet metal bent into channel form by having its edges 11 and 12 bent along lines paralleling its sides to form edge flanges. If desired a portion of the plate 10 may be upset as indicated to form vegetable grating teeth 13; and the plate may be formed with a rear attenuating portion 14 preferably bent into the form of a curved channel in cross section and provided with a protruding vegetable paring blade 15 and a sharpened tip 16 for digging out the eyes of potatoes and performing similar culinary acts.

The plate 10 forms a handle for a straight edged chisel blade 17 formed integrally with the plate and projecting from the forward edge 18 of the latter. The width of the chisel blade 17 is less than that of the handle 10 and is formed centrally of the handle. At the center of the handle and extending longitudinally thereof is a straight slot 19 extending from a point near the edge of chisel blade 17 backwardly along the handle. A circular rotatable cutting blade 21 centrally apertured is laid flat against the upper surface of handle 10 between flanges 11 and 12, the central aperture being in register with the slot 19. The diameter of the central aperture 22 of cutting blade 21 is somewhat greater than the width of slot 19 so that the pivot pin 23 on which the round cutting blade is rotatably mounted abuts against the plate 10 about slot 19 and does not enter the slot. The pivot pin 23 has a head 24, and the distance from the head to the end of the pivot pin is very slightly greater than the thickness of the round cutting blade 21, so that head 24 cannot be drawn down so tightly against the blade 21 as to prevent rotation of the latter freely. The pivot pin 23 terminates downwardly in a threaded bolt 25 which traverses slot 19 and carries a wing nut 26 adapted to bear against the lower side of handle 10 to hold the pivot pin in any adjusted position in slot 19. The diameter of the round cutting blade 21 is less than the width of plate 10 and the depth of flanges 11 and 12 greater than the thickness of this blade. Thus, when the round blade is in its inoperative position, as seen in Figs. 1 and 2, the plate 10 and flanges 11 and 12 form a guard to protect the fingers of the operator from coming into contact with its sharp edge. The round blade is of such diameter and slot 19 extended a sufficient distance back from the chisel blade 17 as to prevent the sharp edge of round blade 21 from intersecting the corners formed by the forward end 18 of the handle and the sides of the chisel 17 when the pivot pin 23 is retracted to the inner end of slot 19.

In the operation of the invention, and assuming that the operator wishes to cut into strips a thin sheet of dough lying on a kneading board, the wing nut 26 is loosened and pivot pin 23 shifted from the positions shown forwardly to the front end of slot 19, causing the rotatable cutting blade 21 to take the position illustrated in dotted lines in Fig. 1. The wing nut is now screwed against handle 10, but, because of the contact between the lower end of the pin and the sides of slot 19, head 24 of the pin is not bound against the round blade and the latter is free to rotate. The operator now cuts the dough by rolling the blade 21 through it, the periphery of this blade being beveled on its upper side, as at 27, to sharpen its edge. It will be noted that the chisel blade 17 is also sharpened by beveling its upper edge; thus, when the round blade 21 is in retracted position and the chisel is used for paring vegetables or any other cutting operation requiring its forward movement, that material cut off will be deflected from handle 10, first by the bevel of blade 17 and then by the bevel 27 of blade 21. The head 24 of the pivot pin is also positioned on the upper side of blade 21, and, being rounded, offers a third beveled surface designed to deflect cut-off material away from handle 10. Preferably the diameter of rotatable blade 21 is so large as to project its periphery outwardly of the sides and end of chisel blade 17 in the operative position of the rotatable blade, as shown in Fig. 1. When it is desired to use chisel blade 17, the round blade 21 is adjusted to its rear or inward position as seen in full lines in the drawings. While the head 24 of the pivot pin does not bind tightly against the round cutting blade, it nevertheless holds the cutting edge of the latter so close to the upper surface of handle 10 as to prevent the operator from casually cutting himself when the round blade is in retracted position.

While I have illustrated and described the preferred embodiment of my invention, it will be understood that one skilled in the art might make modifications thereof without departing from the spirit of the invention. I wish, therefore, not to be restricted to the precise embodiment shown, except in so far as the same is limited in the appended claims.

I claim:

1. The combination with a channel-shaped handle, of a circular cutting blade pivoted in the channel thereof and adjustable to a position wherein a portion of its circumference stands clear of the handle.

2. The combination with a chisel blade having a slot commencing near its edge and extending backwardly therefrom, of a pivot pin traversing the slot and attachable to the blade at any point along said slot, and a round cutting blade rotatably mounted on the pin.

3. The combination with a chisel blade having a slot extending backwardly from a point near its edge, of a pivot pin traversing the slot and attachable to the blade at any point along said slot, and a round cutting blade rotatably mounted on the pin, said slot being of sufficient length to permit retraction of the round blade to a point back of the edge of the chisel.

4. The combination with a handle having a central longitudinally disposed slot, a threaded bolt traversing the slot, a pivot pin of greater thickness than said slot formed on the bolt, a head on the pivot pin, a wing nut threaded on the bolt, and a circular cutting blade mounted on the pivot pin between its head and said handle, the length of the pin being slightly greater than the thickness of the blade.

5. The combination with a flat handle, and a straight edged chisel projecting forwardly from one end thereof, of a round cutting blade pivoted to the handle and adjustable from a position entirely within the edges of the handle and chisel to one of projection beyond the sides and end of the chisel.

6. The combination with a handle having a chisel projecting from one end, of a rotatable cutting blade lying flat against the upper surface of the handle and chisel, and a pivot pin attached to the handle and having a rounded head juxtaposed to the upper side of the blade, said blade being adjustable to a position back of the end of the chisel, and said chisel and blade being each formed with an edge bevel on its upper surface.

In testimony whereof I have affixed my signature.

THEODORE SMOLINSKY.

Copies of this patent may be obtained for five cents each, by addressing the "Commissioner of Patents, Washington, D. C."